United States Patent
Sridhar et al.

(10) Patent No.: US 11,902,548 B2
(45) Date of Patent: Feb. 13, 2024

(54) SYSTEMS, METHODS AND COMPUTER MEDIA FOR JOINT ATTENTION VIDEO PROCESSING

(71) Applicants: Deepak Sridhar, Richmond Hill (CA); Niamul Quader, Toronto (CA); Srikanth Muralidharan, Thornhill (CA); Yaoxin Li, Montreal (CA); Juwei Lu, North York (CA); Peng Dai, Markham (CA)

(72) Inventors: Deepak Sridhar, Richmond Hill (CA); Niamul Quader, Toronto (CA); Srikanth Muralidharan, Thornhill (CA); Yaoxin Li, Montreal (CA); Juwei Lu, North York (CA); Peng Dai, Markham (CA)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 505 days.

(21) Appl. No.: 17/203,613

(22) Filed: Mar. 16, 2021

(65) Prior Publication Data
US 2022/0303560 A1 Sep. 22, 2022

(51) Int. Cl.
G06N 3/045 (2023.01)
H04N 19/20 (2014.01)
G06N 3/082 (2023.01)

(52) U.S. Cl.
CPC ............ *H04N 19/20* (2014.11); *G06N 3/045* (2023.01); *G06N 3/082* (2013.01)

(58) Field of Classification Search
CPC ........ H04N 19/20; G06N 3/045; G06N 3/082; G06N 3/047; G06N 3/084
See application file for complete search history.

(56) References Cited

U.S. PATENT DOCUMENTS

| | | | | |
|---|---|---|---|---|
| 11,232,308 B2 * | 1/2022 | Gao | ........................ | G06N 3/084 |
| 11,521,044 B2 * | 12/2022 | Mac | ........................ | G06N 3/08 |
| 11,568,247 B2 * | 1/2023 | Kadav | ................... | G06N 3/048 |

(Continued)

FOREIGN PATENT DOCUMENTS

| CN | 111310676 A | 6/2020 |
|---|---|---|
| CN | 111539289 A | 8/2020 |

(Continued)

OTHER PUBLICATIONS

Long, F., et al., "Gaussian Temporal Awareness Networks for Action Localization" CVPR, arXiv:1909.03877, 2019.

(Continued)

*Primary Examiner* — Phuoc Tran (57) ABSTRACT

Systems, methods, and computer media of processing a video are disclosed. An example method may include: receiving a plurality of video frames of a video; generating a plurality of first input features based on the plurality of video frames; generating a plurality of second input features based on reversing a temporal order of the plurality of first input features; generating a first set of joint attention features based on the plurality of first input features; generating a second set of joint attention features based on the plurality of second input features; and concatenating the first set of joint attention features and the second set of joint attention features to generate a final set of joint attention features.

20 Claims, 8 Drawing Sheets

(56) References Cited

U.S. PATENT DOCUMENTS

2020/0057935 A1    2/2020  Wang et al.
2020/0366960 A1   11/2020  Quader et al.
2022/0164569 A1*   5/2022  Kim .................... G06V 10/82

FOREIGN PATENT DOCUMENTS

CN    111931713 A    11/2020
CN    112364757 A     2/2021

OTHER PUBLICATIONS

Xu, M., et al., "G-TAD: Sub-Graph Localization for Temporal Action Detection" arXiv:1911.11462v2 [cs.CV], Apr. 2, 2020.
Gao, J., et al., "Accurate Temporal Action Proposal Generation with Relation-Aware Pyramid Network" arXiv:2003.04145v1 [cs.CV], Mar. 9, 2020.
Zeng, R., et al., "Graph Convolutional Networks for Temporal Action Localization" arXiv:1909.03252, Sep. 7, 2019.
Gong, G., et al., "Learning Temporal Co-Attention Models for Unsupervised Video Action Localization" (CVPR), 2020, pp. 9819-9828.
Dai, R., et al., "PDAN: Pyramid Dilated Attention Network for Action Detection" (WACV), 2021, pp. 2970-2979.
Vaswani, A., et al., "Attention is All You Need" arXiv:1706.03762v5 [cs.CL], Dec. 6, 2017.

\* cited by examiner

800 iteratively, for each video clip i in a plurality of video clips of a video, until convergence:

810 receiving a plurality of video frames of the video clip 820 retrieving a plurality of first input features previously extracted based on the plurality of video frames 830 generating a plurality of second input features, by the action classification model, based on the plurality of video frames 840 computing a classification loss of the action classification model based on the plurality of second input features 850 generating an updated set of input features based on the plurality of first input features and the plurality of second input features 860 generating a plurality of action localization labels using an action localization network based on the updated set of input features 870 computing a localization loss of the action localization network based on the plurality of action localization labels 880 computing an updated loss based on the classification loss and the localization loss 890 adjusting one or more weights of the action classification model based on the updated loss

FIG. 8

SYSTEMS, METHODS AND COMPUTER MEDIA FOR JOINT ATTENTION VIDEO PROCESSING

REFERENCE TO RELATED APPLICATIONS

This is the first application for this disclosure.

FIELD

The present application relates to systems and methods for video processing and analysis, and in particular to video processing based on joint attention processing or training of an action classification model.

BACKGROUND

Video understanding has gained utmost importance in recent years due to availability of large scale annotated datasets. In video understanding, temporal action detection is a fundamental yet challenging task. Temporal action detection generally involves processing a video to find and label different actions, as well as the respective start and end timestamps for each of the labelled actions. Applications for temporal action detection include video surveillance, video analysis and video retrieval.

Boundary Matching Network (BMN) is a known method that performs temporal action detection with accuracy. However, BMN may be inefficient since it tries to score predefined anchors and might generate inaccurate start or end times for the labelled actions. Other methods show that temporal context is important to action localization. Gaussian Temporal Awareness Network (GTAN) uses Gaussian kernels to model temporal context implicitly. Sub-Graph Temporal Action Detection (GTAD) constructs a graph and models the temporal and semantic relations between the features. Relation Aware Pyramid Network (RAPnet) uses Relation Aware Module (RAM) to capture long-range dependencies. Pseudo Graph Convolutional Network (PGCN) is a post-processing method that may be implemented to improve the accuracy of temporal action detection networks such as BMN.

Attention mechanisms have been explored in the context of image recognition, detection and segmentation. However, attention mechanisms are not yet widely adopted in the field of temporal action detection. Recently, Action Co-Localization (ACL) models are used with class specific and class agnostic attention for unsupervised action localization. Pyramid Dilated Attention Network (PDAN) uses a Dilated Attention Layer (DAL) to build Pyramid-DAL net to learn better local representations across time. A major issue with these attention mechanism is that they attend to only consider one of the spatial and temporal dimensions, or even when they do take into account of both the spatial and temporal dimensions for spatio-temporal localization, the spatial and temporal dimensions are formulated differently.

Feature (e.g., class) dependent temporal detection systems implemented based on joint attention of both spatial and temporal features in a 2D feature space have not been explored in video understanding tasks.

SUMMARY

The disclosed systems, methods and computer-readable media are implemented to compute temporal video features with a joint attention mechanism, in some embodiments by processing the one-dimensional (1D) input sequences as two-dimensional (2D) features, and in some embodiments by further jointly attending to both temporal and spatial features while computing the attention weights. To further make efficient use of this joint attention mechanism, the temporal order of the input sequence is reversed while computing the attention weights during video processing. The advantages of the joint attention mechanisms described herein may generate video temporal features that are more accurate for downstream video understanding tasks. The 2D joint attention mechanism may be implemented as a pluggable module that can be extensible to other tasks such as processing 1D audio features, audio-visual features or visual-text features.

The disclosure also provides a joint training mechanism for both the action classification model and the action localization network to improve the features extracted by the action classification model. The training process is more efficient and less computationally expensive, as it fine-tunes the action classification model using losses from both the action classification model and the action localization network. Example applications of the trained the action classification model and the action localization network include video surveillance, video segments retrieval, video recommendations and video tagging.

According to a first example aspect, a computer implemented method for processing a video, the method may include: receiving a plurality of video frames of a video; generating a plurality of first input features based on the plurality of video frames; generating a plurality of second input features based on reversing a temporal order of the plurality of first input features; generating a first set of joint attention features based on the plurality of first input features; generating a second set of joint attention features based on the plurality of second input features; and concatenating the first set of joint attention features and the second set of joint attention features to generate a final set of joint attention features.

In some embodiments, generating the first set of joint attention features based on the plurality of first input features may include: generating a set of attention weights based on the plurality of first input features; extracting a set of position-encoded input features based on the plurality of first input features; and computing the first set of joint attention features based on multiplying the set of attention weights by the set of position-encoded input features.

In some embodiments, generating the set of attention weights for the plurality of first input features may include: adding a dimension to the plurality of first input features to generate a 2D feature map; and transforming the 2D feature map to generate the set of attention weights for the plurality of first input features.

In some embodiments, the method may include: processing the final set of joint attention features to generate: one or more action localization labels of the video; a corresponding start time for each of the one or more action localization labels of the video; and a corresponding end time for each of the one or more action localization labels of the video.

In some embodiments, the one or more action localization labels of the video are generated by a Boundary Matching Network (BMN) or a Sub-Graph Temporal Action Detection (GTAD) based on the final set of joint attention features.

In some embodiments, the plurality of first input features are generated based on the plurality of video frames by an action classification model.

In some embodiments, the action classification model comprises Temporal Segment Networks (TSN) or a Temporal Shift Model (TSM).

In accordance with another aspect, there is a computer implemented method for training an action classification model, the method may include, iteratively, for each video clip in a plurality of video clips of a video: receiving a plurality of video frames of the video clip; retrieving a plurality of first input features previously extracted based on the plurality of video frames; generating a plurality of second input features, by the action classification model, based on the plurality of video frames; computing a classification loss of the action classification model based on the plurality of second input features; generating an updated set of input features based on the plurality of first input features and the plurality of second input features; generating a plurality of action localization labels using an action localization network based on the updated set of input features; computing a localization loss of the action localization network based on the plurality of action localization labels; computing an updated loss based on the classification loss of the action classification model and the localization loss of the action localization network; and adjusting one or more weights of the action classification model based on the updated loss.

In some embodiments, the updated set of input features is generated based on the equation:

$$C_i = \alpha * C_{new} + (1-\alpha) * C_{i,old}$$

where $C_i$ represents the updated set of input features, $C_{i,old}$ represents the plurality of first input features, represents the plurality of second input features, and a represents a parameter $\in R$.

In some embodiments, a is a value between 0.01 to 0.1.

In some embodiments, generating the plurality of action localization labels using the action localization network based on the updated set of input features may include: retrieving a set of previously extracted input features $C_V$ of the video, $C_V$ including $C_{i,old}$, updating $C_V$ by replacing $C_{i,old}$ with $C_i$ to obtain updated $C_V'$; and computing the plurality of action localization labels using the action localization network based on the updated $C_V'$.

In some embodiments, the updated loss is computed based on the equation:

$$L_T = \beta * L_c + (1-\beta) * L_l$$

where $L_T$ represents the updated loss, $L_c$ represents the classification loss of the action classification model, $L_l$ represents the localization loss of the action localization network, and $\beta$ represents a parameter $\in R$.

In some embodiments, $\beta$ is a value between 0.1 to 0.9.

In some embodiments, the action classification model includes Temporal Segment Networks or a Temporal Shift Model.

In some embodiments, the action localization network includes a BMN, a Gaussian Temporal Awareness Network or a GTAD.

In accordance with yet another aspect, there is provided a system for processing a video, the system may include: a processing unit; and a memory coupled to the processing unit, the memory storing machine-executable instructions that, when executed by the processing unit, cause the system to: receive a plurality of video frames of a video; generate a plurality of first input features based on the plurality of video frames; generate a plurality of second input features based on reversing a temporal order of the plurality of first input features; generate a first set of joint attention features based on the plurality of first input features; generate a second set of joint attention features based on the plurality of second input features; and concatenate the first set of joint attention features and the second set of joint attention features to generate a final set of joint attention features.

In some embodiments, the machine-executable instructions, when executed by the processing unit, cause the system to generate the first set of joint attention features by: generating a set of attention weights based on the plurality of first input features; extracting a set of position-encoded input features based on the plurality of first input features; and computing the first set of joint attention features based on multiplying the set of attention weights by the set of position-encoded input features.

In some embodiments, the machine-executable instructions, when executed by the processing unit, cause the system to generate the set of attention weights for the plurality of first input features by: adding a dimension to the plurality of first input features to generate a 2D feature map; and transforming the 2D feature map to generate the set of attention weights for the plurality of first input features.

In some embodiments, the machine-executable instructions, when executed by the processing unit, further cause the system to process the final set of joint attention features to generate: one or more action localization labels of the video; a corresponding start time for each of the one or more action localization labels of the video; and a corresponding end time for each of the one or more action localization labels of the video.

In some embodiments, the plurality of first input features are generated based on the plurality of video frames by an action classification model.

In accordance with an aspect, there is provided a system for processing a video, the system may include: a processing unit; and a memory coupled to the processing unit, the memory storing machine-executable instructions that, when executed by the processing unit, cause the system to, iteratively, for each video clip in a plurality of video clips of a video: receive a plurality of video frames of the video clip; retrieve a plurality of first input features previously extracted based on the plurality of video frames; generate a plurality of second input features, by the action classification model, based on the plurality of video frames; compute a classification loss of the action classification model based on the plurality of second input features; generate an updated set of input features based on the plurality of first input features and the plurality of second input features; generate a plurality of action localization labels using an action localization network based on the updated set of input features; compute a localization loss of the action localization network based on the plurality of action localization labels; compute an updated loss based on the classification loss of the action classification model and the localization loss of the action localization network; and adjust one or more weights of the action classification model based on the updated loss.

In some embodiments, the updated set of input features is generated based on the equation:

$$C_i = \alpha * C_{i,new} + (1-\alpha) * C_{i,old}$$

where $C_i$ represents the updated set of input features, $C_{i,old}$ represents the plurality of first input features, $C_{i,new}$ represents the plurality of second input features, and a represents a parameter $\in R$.

In some embodiments, a is a value between 0.01 to 0.1.

In some embodiments, generating the plurality of action localization labels using the action localization network based on the updated set of input features may include: retrieving a set of previously extracted input features $C_V$ of the video, $C_V$ including $C_{i,old}$, updating $C_V$ by replacing $C_{i,old}$ with $C_i$ to obtain updated $C_V'$; and computing the plurality of action localization labels using the action localization network based on the updated $C_V'$.

In some embodiments, the updated loss is computed based on the equation:

$$L_T = \beta * L_c + (1-\beta) * L_l$$

where $L_T$ represents the updated loss, $L_c$ represents the classification loss of the action classification model, $L_l$ represents the localization loss of the action localization network, and β represents a parameter ∈ R.

In some embodiments, β is a value between 0.1 to 0.9.

In some embodiments, the action classification model includes Temporal Segment Networks or a Temporal Shift Model.

In some embodiments, the action localization network includes a BMN, a Gaussian Temporal Awareness Network or a GTAD.

In accordance with another aspect, a non-transitory computer readable medium storing machine-readable instructions for configuring a processing unit to process a video is disclosed, the machine-readable instructions are configured to processing unit to: receive a plurality of video frames of a video; generate a plurality of first input features based on the plurality of video frames; generate a plurality of second input features based on reversing a temporal order of the plurality of first input features; generate a first set of joint attention features based on the plurality of first input features; generate a second set of joint attention features based on the plurality of second input features; and concatenate the first set of joint attention features and the second set of joint attention features to generate a final set of joint attention features.

In accordance with yet another aspect, a non-transitory computer readable medium storing machine-readable instructions for configuring a processing unit to process a video is disclosed, the machine-readable instructions are configured to processing unit to, iteratively, for each video clip in a plurality of video clips of a video: receive a plurality of video frames of the video clip; retrieve a plurality of first input features previously extracted based on the plurality of video frames; generate a plurality of second input features, by the action classification model, based on the plurality of video frames; compute a classification loss of the action classification model based on the plurality of second input features; generate an updated set of input features based on the plurality of first input features and the plurality of second input features; generate a plurality of action localization labels using an action localization network based on the updated set of input features; compute a localization loss of the action localization network based on the plurality of action localization labels; compute an updated loss based on the classification loss of the action classification model and the localization loss of the action localization network; and adjust one or more weights of the action classification model based on the updated loss.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

The present disclosure is made with reference to the accompanying drawings, in which embodiments are shown. However, many different embodiments may be used, and thus the description should not be construed as limited to the embodiments set forth herein. Rather, these embodiments are provided so that this disclosure will be thorough and complete. Like numbers refer to like elements throughout, and prime notation is used to indicate similar elements, operations or steps in alternative embodiments. Separate boxes or illustrated separation of functional elements of illustrated systems and devices does not necessarily require physical separation of such functions, as communication between such elements may occur by way of messaging, function calls, shared memory space, and so on, without any such physical separation. As such, functions need not be implemented in physically or logically separated platforms, although they are illustrated separately for ease of explanation herein. Different devices may have different designs, such that although some devices implement some functions in fixed function hardware, other devices may implement such functions in a programmable processor with code obtained from a machine readable medium.

Throughout this disclosure, the term "coupled" may mean directly or indirectly connected, electrically coupled, or operably connected; the term "connection" may mean any operable connection, including direct or indirect connection. In addition, the phrase "coupled with" is defined to mean directly connected to or indirectly connected through one or more intermediate components. Such intermediate components may include both or either of hardware and software-based components.

Further, a communication interface may include any operable connection. An operable connection may be one in which signals, physical communications, and/or logical communications may be sent and/or received. An operable connection may include a physical interface, an electrical interface, and/or a data interface.

Figure 1:
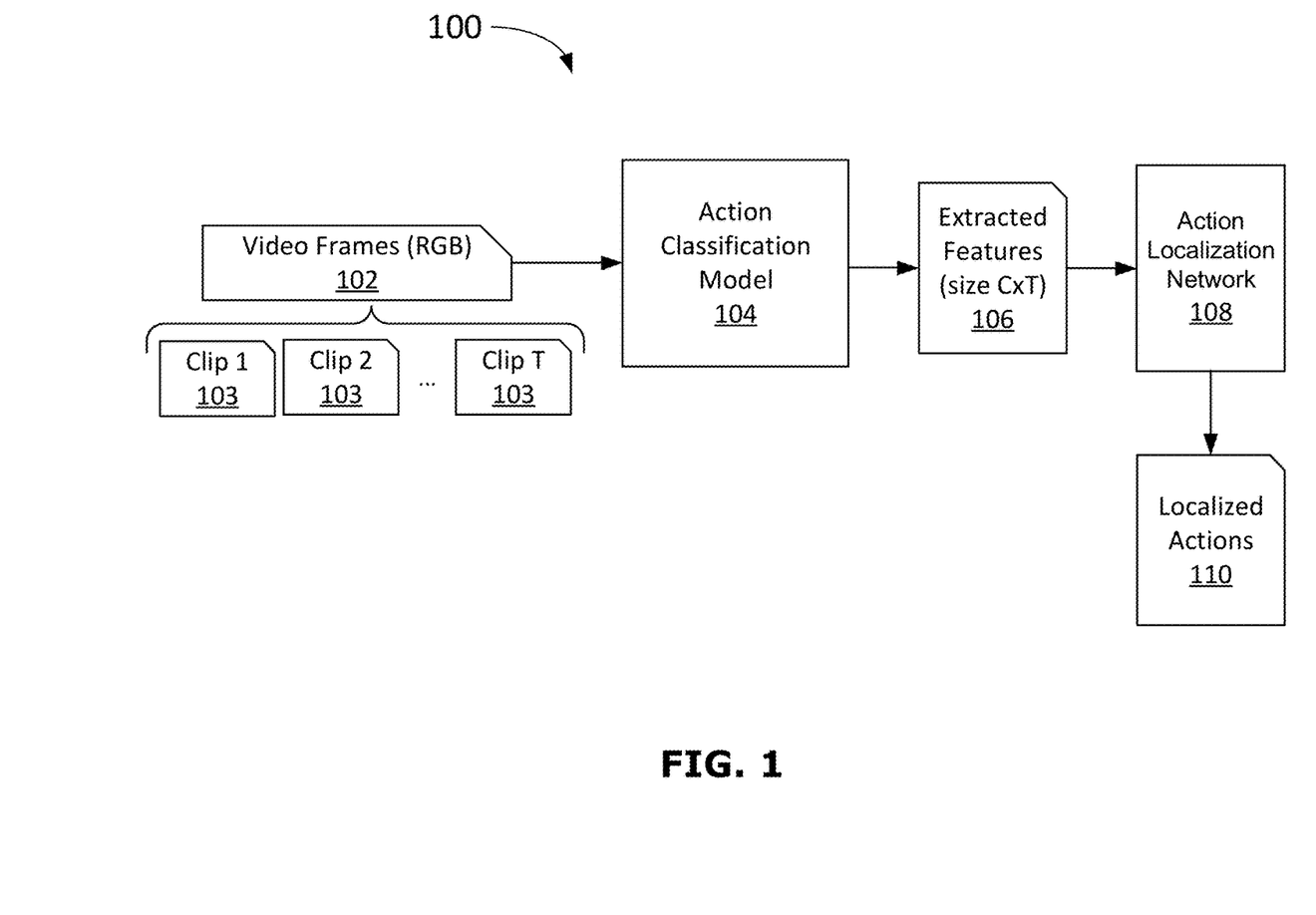
FIG. 1 is a block diagram of an example video processing system in accordance with an example embodiment.

FIG. 1 is a block diagram 100 of an example video processing system in accordance with an example embodiment. For video understanding tasks that require temporal features to generate a result (e.g., action localization or segmentation), temporal features 106 need to be extracted by an action classification model 104 based on a plurality of video frames 102, which may be grouped into one or more video clips 103. An action classification model 104 can be, in some embodiments, a machine learning model that is trained to identify one or more actions (e.g., jump, run, walk) that has appeared in a given video. The features 106 are then used for downstream tasks such as action localization.

Each video frame 102 may include image data that defines a set of RGB pixel values that can be rendered by a browser and displayed on a viewing device. Video frames 102 may also include audio data that is synchronized with the image data. Video frames 102 may also include text data that has been provided by a pre-processing system, such as a closed captioning system, based on audio data. In various examples, video frames 102 may include metadata that indicates, among other things, a file size, duration, creation date and resolution.

The video frames 102 may be divided into a plurality of video clips 103. There may be a total number of T clips. The video frames 102 can be input to the action classification model 104 to generate features 106, which may have a size of C×T, where T is the number of clips in that video, where T may be selected empirically (e.g., T=100), and C is the number of features per temporal point (e.g., C=256). The extracted features 106 may be stored on a memory device, and used by an action localization network 108, which is a trained machine learning model, to generate the localized actions 110.

The features 106 extracted by the action classification model 104 (which may also be referred to as an action classifier throughout the disclosure) can contain a variety of information, include information irrelevant or unrelated to a target action or task at hand. It is important to extract features that can contribute the most for downstream tasks in order to improve the accuracy in performing the downstream tasks (e.g., finding localized actions). Therefore, it is important to improve the training process of the action classification model 104 so that the extracted features 106 exclude as much unrelated information as possible.

The action localization network 108 may include, as non-limiting example, a BMN, a Gaussian Temporal Awareness Network or a Sub-Graph Temporal Action Detection.

The localized actions 110 generated by the action localization network 108 can include descriptive labels that describes an action such as "jump", "run", or "walk". The localized actions 110 may also include, for each of these action labels, a respective frame number of the respective video frame 102, a start timestamp, and/or an end timestamp (e.g., "walk": minutes 1:01 to 2:04 of frame 12; or "run": minutes 2:05 to 7:08 of frame 12).

Figure 2:
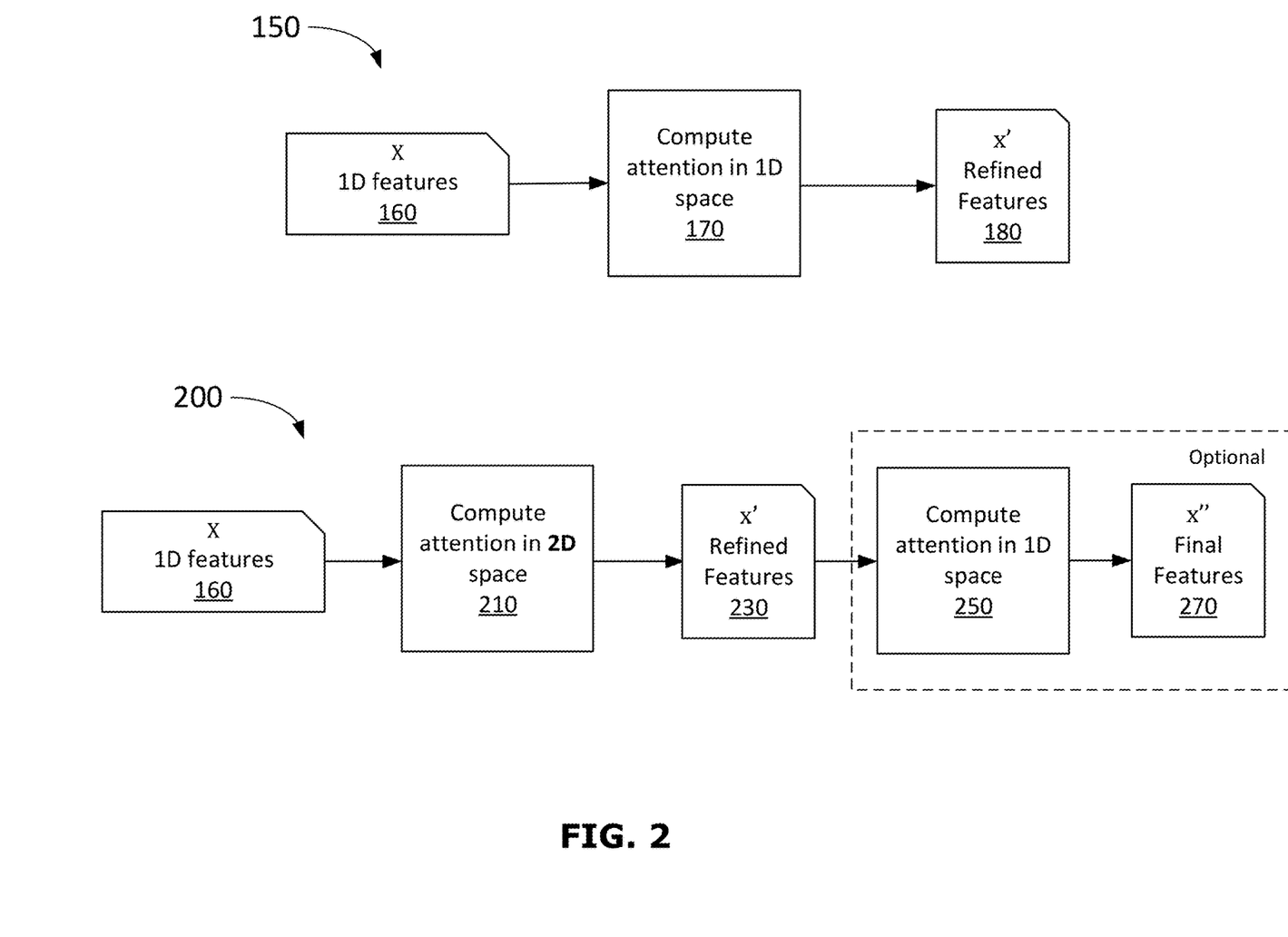
FIG. 2 shows an example process of generating refined features for video processing in accordance with an example embodiment.

FIG. 2 shows an example process 150 of a prior art system and an example process 200 of generating refined features 230 for video processing in accordance with an example embodiment. Process 150 shows a prior art process where 1D features (x) 160 are used to compute attention weights (which may be referred to as simply 'attention' throughout the disclosure) in 1D space in a sub-process 170 to generate refined features (x') 180.

To improve the feature representations for video understanding tasks, the temporal attention weights may be computed based on the 2D temporal feature maps (e.g., class probabilities), as shown in process 200. In this process 200, 1D features (x) 160 may be transformed into a 2D feature map and used to compute attention weights in 2D space in a sub-process 210 to generate refined features (x') 230. The refined features (x') 230 may, in an optional further process, be used to compute attention weights in 1D space in sub-process 250 to generate final features (x") 270. The generated final features (x") 270 may accurately predict the temporal boundaries and used to further generate localization actions by an action localization network.

Figure 3:
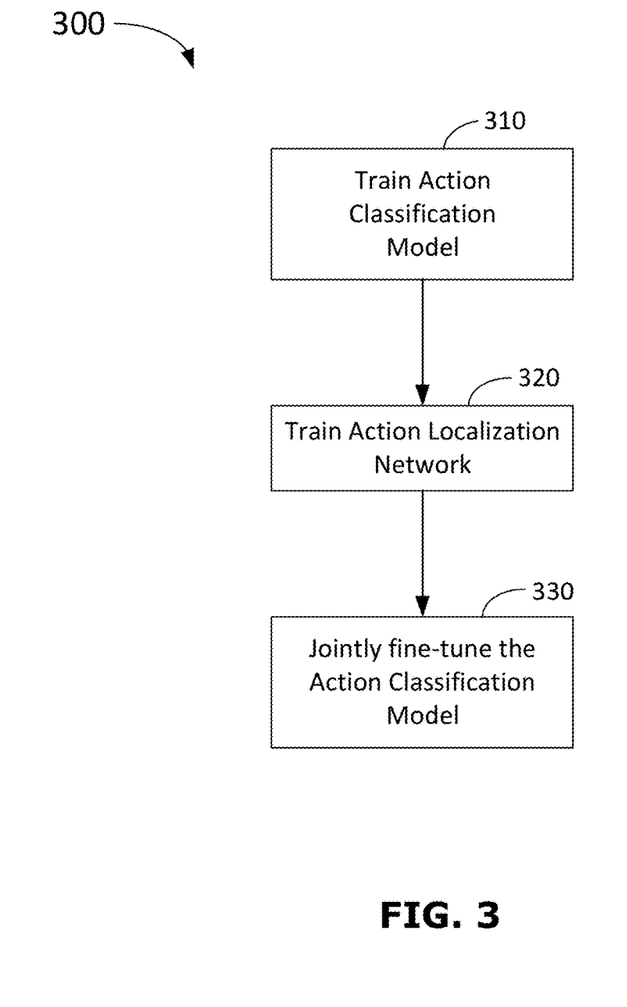
FIG. 3 shows an example process of training an action classification model in accordance with an example embodiment.

FIG. 3 shows an example process 300 of training an action classification model in accordance with an example embodiment. Typically, prior art systems tend to train the action classification model (e.g., the action classification model 104 in FIG. 1) separately, independent from the training process of the action localization network. In contrast, the training approach 300 disclosed herein use losses from both the action classification model and the action localization network to jointly fine-tune the action classification model.

At operation 310, an action classification model may be trained on video frames of a video to obtain rich features for accurate action recognition. Examples of the action classification model can be a pre-trained action recognition model using training data from known action datasets such as Kinetics, ActivityNet or Human Action Clips and Segments (HACS). Other variations of the models can include self-supervised or unsupervised action classification models.

At operation 320, an action localization network or any downstream video understanding task model (e.g., Boundary Sensitive Network, BMN or GTAD) may be trained for obtaining baseline results on a given target task.

At step 330, the action classification model may be jointly fine-tuned by combining a loss from the action classification model and a loss from the action localization network from each video. The input to the action classification model (e.g., TSM, TSN) are RGB frames or optical flow frames, which are motion feature transformations of the RGB frames. The extracted features from the action classification model are sent to the action localization network. The losses from both of the action classification model and the action localization network are combined to train the action classification model, and optionally to train the action localization network.

The process 300 can be a computationally complex, and not usually feasible for even some of the more powerful computers available today. For this reason, it is rarely implemented. There is disclosed a computationally efficient system for jointly fine-tuning the action classification model. This may be achieved, for example, by processing only one randomly selected clip per video, instead of processing the entire video including T video clips, as will be further described in detail with respect to FIG. 5 below.

Figure 4:
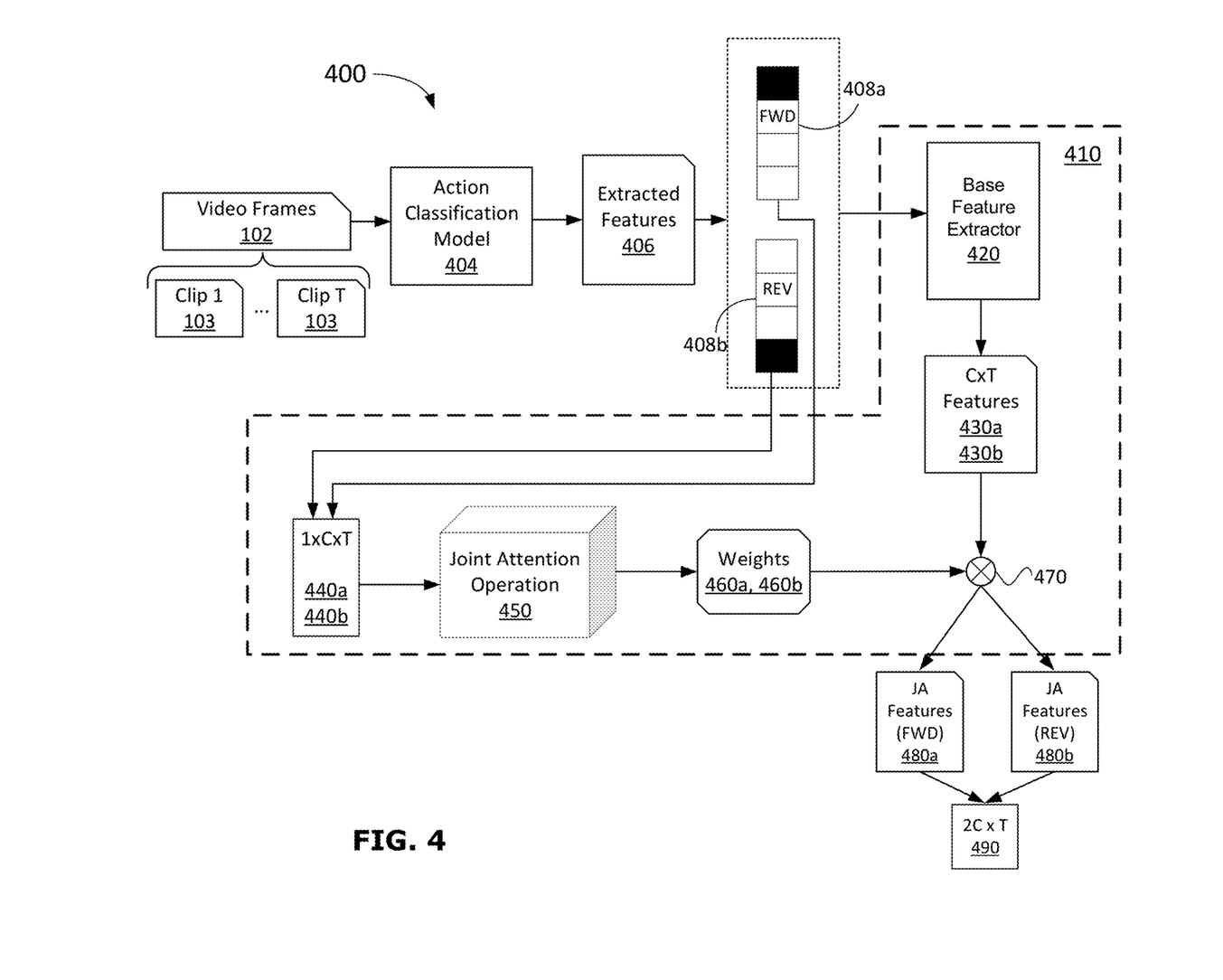
FIG. 4 is a block diagram of an example system for generating video features using a joint attention mechanism, in accordance with an example embodiment.

FIG. 4 shows a block diagram of an example system 400 for generating joint attention features 490 using a joint attention mechanism, in accordance with an example embodiment. This example system 400 is configured to implement a joint attention technique that attends to the 1D input features (which may be referred to as simply 'features' throughout the disclosure) of a video along the temporal and feature dimensions in input sequences. The generation of refined features is jointly conditional on the feature activations (e.g., class scores) and the temporal length of the video, and referred to as the joint attention mechanism or technique.

A plurality of video frames 102, which may be grouped or divided into a total number of T video clips 103, are sent to a pre-trained action classification model 404 to extract features 406. The action classification model 404 can be, in some embodiments, a machine learning model that is trained to identify one or more actions (e.g., jump, run, walk) that has appeared in a given video. The features 406 are then used for downstream tasks such as action localization.

Examples of the pre-trained action classification model 404 can include Temporal Segment Networks (TSN) or a Temporal Shift Model (TSM). For example, the action classification model 404 may be trained using data from ImageNet, or action datasets such as Kinetics, ActivityNet or HACS. An example training process of the action classification model 404 is described in detail with respect to FIG. 5 below.

Each video frame 102 may include at least image data defining a set of RGB pixel values that can be rendered by a browser and displayed on a viewing device. Video frames 102 may also include audio data that is synchronized with the image data. Video frames 102 may also include text data that has been provided by a pre-processing system, such as a closed captioning system, based on audio data. In various examples, video frames 102 may include metadata that indicates, among other things, a file size, duration, creation date and resolution.

The video frames 102 of a video can be sent to the action classification model 404 to generate features 406, which may have a size of C×T, where T is the total number of clips in the video. T may be selected empirically (e.g., T=100), and C is the number of features or class labels per temporal point (e.g., C=256). The extracted features 406 may be stored on a memory device, and used by an action localization network, which is a trained machine learning model, to generate localized actions.

In some embodiments, the features 406 can be extracted from the penultimate feature layer of the action classification model 404 or the final logits layer before applying Softmax operation.

In some embodiments, the extracted features 406 from the action classification model 404 may have a size of F×L, where F is the feature dimension, (e.g., 256) and L is the length of the input video sequence. The system 400 may, in this case, convert the extracted features 406 to a fixed temporal scale or size of C×T. The resizing can be done using interpolation methods such as bilinear, quadratic or bicubic. Alternatively, the system 400 can use more complex interpolation methods such as Basis-splines to achieve the resizing of the extracted features 406 to the size C×T.

The extracted features 406 has a forward (FWD) temporal order that is consistent with the temporal order of the video frames 102, as the features 406 are extracted by the action classification model 404 using the video frames 102 in chronological order. The extracted features 406 with this FWD temporal order may be referred to as a FWD input features 408a. The extracted features may also be modified by reversing the temporal order of the extracted features 406, which results in a reverse (REV) input features 408b.

Each of the FWD input features 408a and the REV input features 408b are 1D input features with size C×T (e.g., 256×100). For each of the FWD input features 408a and the REV input features 408b, sub-process 410 may be performed. That is, the FWD input features 408a may be processed through the sub-process 410 to generate FWD joint attention features 480a, and the REV input features 408b may be processed through the sub-process 410 to generate REV joint attention features 480b, as described in detail next.

Sub-Process 410

In some embodiments, the system 400 may be configured to add a dimension to the FWD input features 408a to generate a 2D feature map 440a (or 2D image feature) of size 1×C×T. For example, this can be done with torch.view or tf in Python programming langue. For another example, reshape functions in TensorFlow may also be used to generate a 2D feature map 440a based on the FWD input features 408a.

Next, a joint attention operation or module 450 may be performed on the 2D feature map 440a to generate set of attention weights 460a for the FWD input features 408a. For example, transformation operations such as convolution or non-local operations may be applied during the joint attention operation 450 on the 2D feature map 440a to obtain the attention weights 460a. A non-local operation can capture long-range dependencies with deep neural network. In general, the transformation operation can be any suitable operation that maps the 2D feature map $440a \in R^{1*C*T}$ to $R^C$ probabilities in attention weights 460a.

The FWD input features 408a are also sent to a base feature extractor or module 420 to generate position-encoded input features 430a, where the position-encoded input features $430a \in R^{C*T}$ have a size of C×T. The base feature extractor 420 may be implemented with a convolution or non-local operation. In some embodiments, the base feature extractor 420 may be trained together with one or more neural networks in the joint attention operation 450. Position encoding may be performed using a known method, such as one described in Vaswani, A., Shazeer, N., Parmar, N., Uszkoreit, J., Jones, L., Gomez, A. N., Kaiser, L., & Polosukhin, I. (2017), Attention is All you Need, ArXiv, abs/1706.03762, the entire content of which is herein incorporated by reference.

The attention weights $460a \in R^{C*1}$ may be multiplied at operation 470 to the position-encoded input features 430a to obtain the joint attention features 480a for the FWD input features 408a.

Similarly, the sub-process 410 may be performed on the REV input features 408b to obtain the joint attention features 480b for the REV input features 408b. the system 400 may be configured to add a dimension to the REV input features 408b to generate a 2D feature map 440b (or 2D image feature) of size 1×C×T. For example, this can be done with torch.view or tf in Python programming langue. For another example, reshape functions in TensorFlow may also be used to generate a 2D feature map 440b based on the REV input features 408b.

Next, a joint attention operation 450 may be performed on the 2D feature map 440b to generate set of attention weights 460b for the REV input features 408b. For example, transformation operations such as convolution or non-local operations may be applied during the joint attention operation 450 on the 2D feature map 440b to obtain the attention weights 460b. A non-local operation can capture long-range dependencies with deep neural network. In general, the transformation operation can be any suitable operation that maps the 2D feature map $440b \in R^{1*C*T}$ to $R^C$ probabilities in attention weights 460b.

The REV input features 408b are also sent to a base feature extractor 420 to generate position-encoded input features 430b, where the position-encoded input features $430b \in R^{C*T}$ have a size of C×T. The base feature extractor 420 may be implemented with a convolution or non-local operation. In some embodiments, the base feature extractor 420 may be trained together with one or more neural networks in the joint attention operation 450.

The attention weights $460b \in R^{C*1}$ may be multiplied at operation 470 to the position-encoded input features 430b to obtain the joint attention features 480b for the REV input features 408b.

Each of the joint attention features 480a, 480b has a size of C×T, and they may be concatenated to obtain a final set of joint attention features $490 \in R^{2C*T}$ of size 2C×T. The joint attention features 490 may be further processed (not shown in FIG. 4) using a sequence of convolutions or other non-linear transformations to obtain the desired results, such as, for example, to generate the respective start time and end time and a corresponding score in action localization using models such as BMN or GTAD.

This systems and methods disclosed herein in experiments are shown to have advanced the state-of-the art in temporal action localization to new benchmark (e.g., 1.5% improvement over previous methods with only 5% increase in model size).

The described 2D attention weights operations, including the transformation of 1D input features to a 2D map and the joint attention operation 450 in this disclosure, can be plugged into any existing architectures for action localization to improve the detection performance (e.g., 0.83% improvement on BMN using context blocks).

As used herein, a "module" or "operation" can refer to a combination of a hardware processing circuit and machine-readable instructions (software and/or firmware) executable on the hardware processing circuit. A hardware processing circuit can include any or some combination of a microprocessor, a core of a multi-core microprocessor, a microcontroller, a programmable integrated circuit, a programmable gate array, a digital signal processor, a general processing unit, an accelerator unit, or another hardware processing circuit. In some examples, module can refer to a purpose configured hardware processing circuit.

Figure 5:
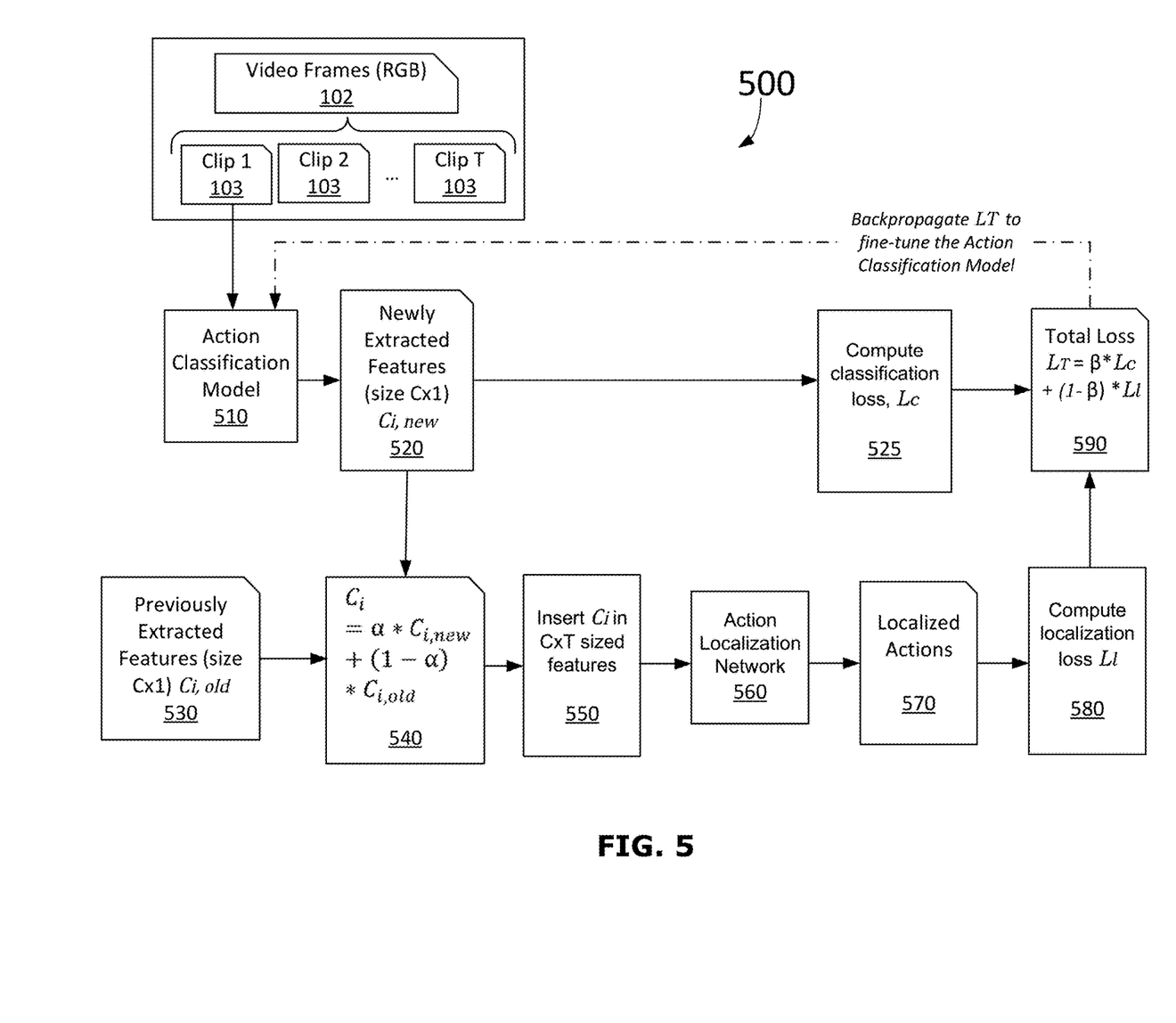
FIG. 5 is a block diagram of an example system for training an action classification model, in accordance with an example embodiment.

In the prior art, the action classification models and other downstream video understanding task networks (e.g. action localization network in FIG. 1) are trained separately. Since they are trained separately, the action classification model cannot be optimally trained for the downstream tasks. Due to this separation in the training process, part of the features extracted by the action classification model can be unrelated or unhelpful for the action localization task by an action localization network. FIG. 5 shows a system configured to improve the features extracted by the action classification model directly by jointly training the action classification model (and optionally the action localization network) based on losses from both the action classification and the action localization networks, so that the input features generated by the action classification model are more suited for downstream video understanding tasks.

FIG. 5 is a block diagram of an example system 500 for training an action classification model 510, in accordance with an example embodiment. Video frames 102, which may be RGB frames and divided or grouped into a plurality of video clips 103 may be input to the system 500. Prior to the training of the action classification model 510, a set of features $C_V$ of size C×T for the entire video including all of the video frames 120 may be previously extracted by an action classification model and saved on a memory storage device, which may be part of the system 500 or accessible to the system 500. T is the number of clips 103 in the video, where T may be selected empirically (e.g., T=100), and C is the number of features per temporal point (e.g., C=256).

During the training process, a video clip i 103, which includes a plurality of video frames, may be randomly selected as input to the action classification model 510 to generate input features $C_{i,new}$ 520 of size C×1. As the action classification model 510 gets fine-tuned in the training, the weights of the action classification model 510 are adjusted, and accordingly, the input features $C_{i,new}$ 520 for a given clip in the video may change as well in each training iteration or epoch. A classification loss $L_c$ 525 may be generated based on the plurality input features $C_{i,new}$ 520.

In the same training epoch, the input features $C_{i,new}$ 520 from the action classification model 510 may be used to generate an updated set of input features $C_i$ 540 based on the equation:

$$C_i = \alpha * C_{i,new} + (1-\alpha) * C_{i,old}$$

where $C_i$ 540 represents the updated set of input features, $C_{i,old}$ 530 represents input features from $C_V$ previously extracted, and corresponding to the video clip being used as input for this training epoch, $C_{i,new}$ 520 represents the plurality of second input features, and $\alpha$ represents a parameter $\in R$.

In some embodiments, $\alpha$ may be a hyper parameter designed to encourage regularization in the training of the action classification model 510. For example, it may have a value between 0.01 to 0.1. For another example, it may have a default value of 0.05.

At operation 550, the updated input features $C_i$ 540 may be used to update the set of previously extracted input features $C_V$ of the video, $C_V$ including $C_{i,old}$ For example, at operation 550, $C_i$ 540 may replace $C_{i,old}$ 530 in the previously extracted input features $C_V$ by replacing the $i_{th}$ location in $C_V$ for the video clip i, to generate updated $c_V'$.

The updated input features $C_V'$ for the entire video may be used as input by the action localization network 560 to generate localized action labels 570. A localization loss $L_l$ 580 of the action localization network may be computed based on the localized action labels 570.

Next, an updated loss $L_T$ 590 may be computed based on the classification loss $L_c$ 525 of the action classification model 510 and the localization loss $L_l$ 580 of the action localization network 560 based on the equation:

$$L_T = \beta * L_c + (1-\beta) * L_l$$

where $L_T$ 590 represents the updated loss, $L_c$ represents the classification loss 525 of the action classification model 510, $L_l$ represents the localization loss 580 of the action localization network 560, and $\beta$ represents a parameter $\in R$.

In some embodiments, $\beta$ may be empirically selected. For example, it may have a value between 0.1 to 0.9. For another example, it may have a default value of 0.5.

The updated loss $L_T$ 590 may be back-propagated to the action classification model 510 for fine-tuning the model 510. For example, the updated loss $L_T$ 590 may be used to adjust one or more weights of the action classification model 510.

Such a training and fine-tuning process for the action classification model 510 may be performed for a particular number of epochs (e.g., 10 epochs), and then the action localization network 560 may be similarly trained and fine-tuned using the outputs of the action classification model 510 (which is now frozen) for another fixed number of epochs (e.g., 10 epochs). An underlying assumption here is that the action classification model 510 and action localization network 560 do not sufficiently change between these alternating cycles of training.

The fine-tuning and optimization process may continue, using the video clips 103, until the action classification model 510 and action localization network 560 both achieve convergence.

Figure 6:
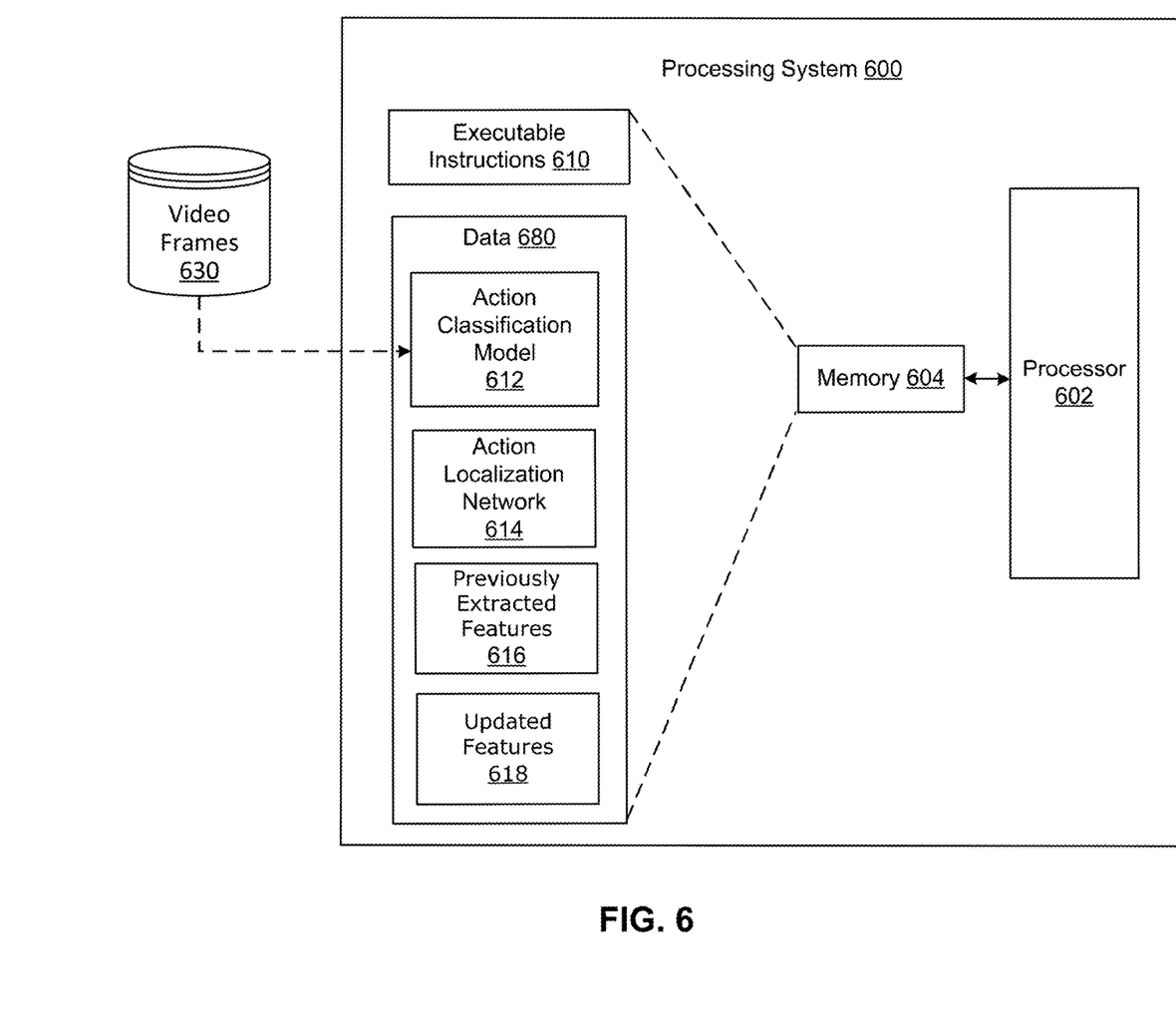
FIG. 6 shows an example processing system for implementing and training an action classification model.

FIG. 6 shows an example processing system 600 for implementing and training an action classification model 612, which is similar to the action classification model 510 in FIG. 5. The processing system 600 includes a processor 602 for executing computer program instructions, and a memory 604 for storing executable instructions and data.

The processing system 600 may be connected to a database 630 for retrieving and/or storage of video frames 102 and video clips 103.

The processor 602 may be embodied as any processing resource capable of executing computer program instructions, such as one or more processors on a computer or computing platform(s). The memory 404 may be embodied as any data storage resource, such as one or more disk drives, random access memory, or volatile or non-volatile memory on one or more computing platforms.

The memory 604 has stored thereon several types of computer programs in the form of executable instructions. It has thereon a set of executable instructions 610 for carrying out the methods described herein. It also has stored thereon one or more sets of instructions of trained neural networks or other machine learned models to generate input features (e.g. joint attention features) based on one or more video frames 102.

The memory 604 may have stored thereon several types of data 680. The data 680 may include, for example, matrix representations 612 representing an action classification model 612 (either pre-trained or in training). The data 680 may also include matrix representations 614 representing an action localization network (either pre-trained or in training). The matrix representations 612, 614 may include matrices or weights used as input to a neural network, as well as matrices updated or generated by the neural network.

The data 680 may further include matrix representations 616 representing previously extracted features (e.g., $C_V$ from the description for FIG. 5), and matrix representations 618 representing updated features 616 (e.g., $C_V'$ from the description for FIG. 5).

Figure 7:
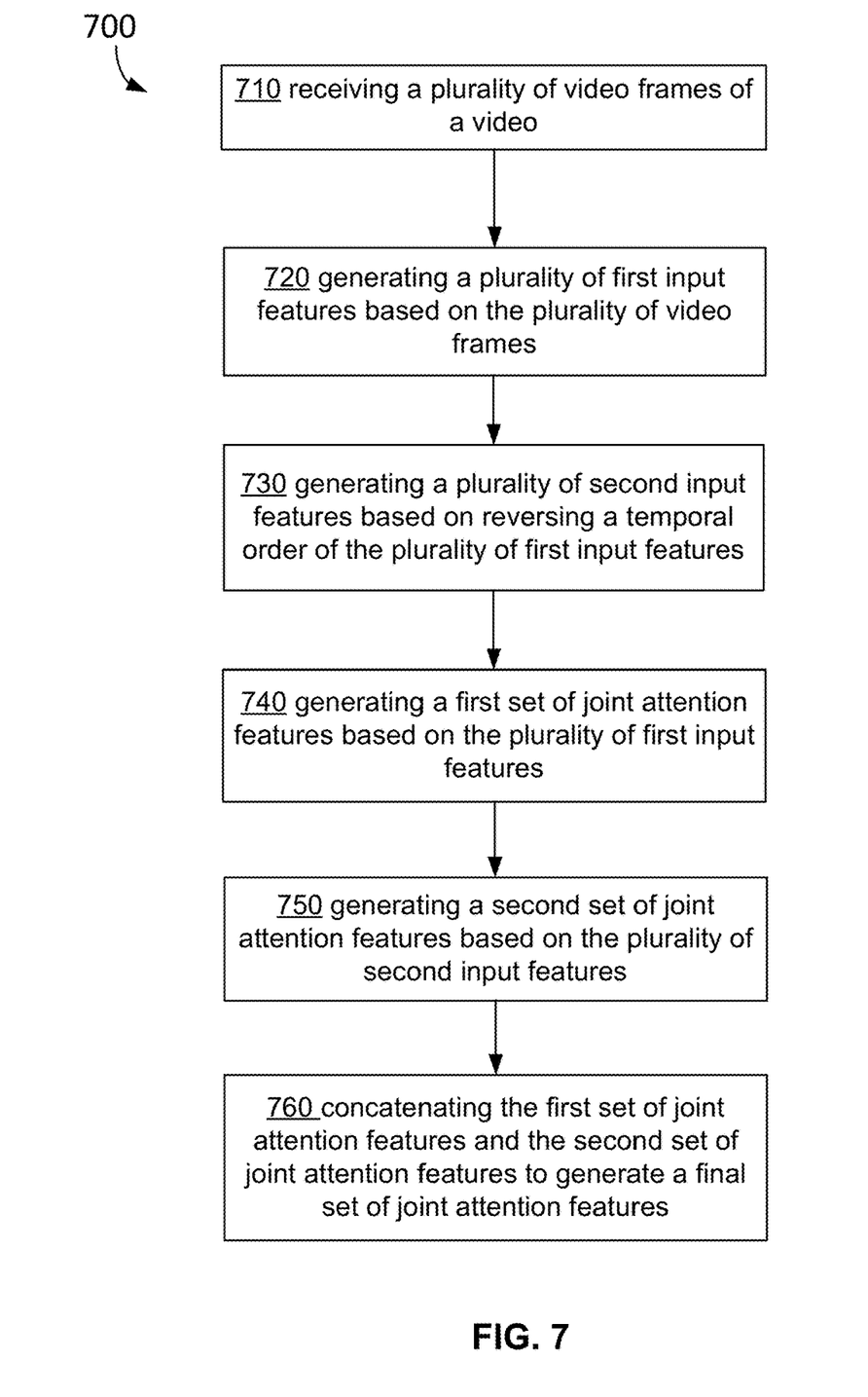
FIG. 7 illustrates an example process for generating video features using a joint attention mechanism, in accordance with an example embodiment.

FIG. 7 illustrates an example process 700 for generating video features (e.g., joint attention features) using a joint attention mechanism, in accordance with an example embodiment. The process 700 may be implemented by a system shown in FIG. 4, for example.

At operation 710, the system may receive a plurality of video frames 102 of a video. The video frames 102 may be grouped into a plurality of video clips 103.

At operation 720, an action classification model 404 may generate a plurality of first input features (e.g. FWD input features 408a) based on the plurality of video frames 102.

At operation 730, a plurality of second input features (e.g. REV input features 408b) may be generated based on reversing a temporal order of the plurality of first input features.

At operation 740, a first set of joint attention features 480a may be generated based on the plurality of first input features (e.g. FWD input features 408a).

In some embodiments, generating the first set of joint attention features 480a may include: generating a set of attention weights 460a based on the plurality of first input features 408a; extracting a set of position-encoded input features 430a based on the plurality of first input features 408a; and computing the first set of joint attention features 480a based on multiplying the set of attention weights 460a by the set of position-encoded input features 430a.

In some embodiments, generating the set of attention weights 460a may include: adding a dimension to the plurality of first input features 408a to generate a 2D feature map 440a; and transforming the 2D feature map 440a to generate the set of attention weights 460a for the plurality of first input features.

At operation 750, a second set of joint attention features 480b may be generated based on the plurality of second input features (e.g. REV input features 408b).

In some embodiments, generating the second set of joint attention features 480a may include: generating a set of attention weights 460b based on the plurality of second input features 408b; extracting a set of position-encoded input features 430b based on the plurality of second input features 408b; and computing the second set of joint attention features 480b based on multiplying the set of attention weights 460b by the set of position-encoded input features 430b.

In some embodiments, generating the set of attention weights 460b for the plurality of second input features 408b may include: adding a dimension to the plurality of second input features 408b to generate a 2D feature map 440b; and transforming the 2D feature map 440b to generate the set of attention weights 460b for the plurality of second input features 408b.

At operation 760, the first set of joint attention features 480a and the second set of joint attention features 480b may be concatenated to generate a final set of joint attention features 490.

In some embodiments, the process 700 may further include: processing the final set of joint attention features 490 to generate: one or more action localization labels of the video; a corresponding start time for each of the one or more action localization labels of the video; and a corresponding end time for each of the one or more action localization labels of the video.

In some embodiments, the one or more action localization labels of the video are generated by a Boundary Matching Network (BMN) or a Sub-Graph Temporal Action Detection (GTAD) based on the final set of joint attention features 490.

In some embodiments, the action classification model may include Temporal Segment Networks (TSN) or a Temporal Shift Model (TSM).

Figure 8:
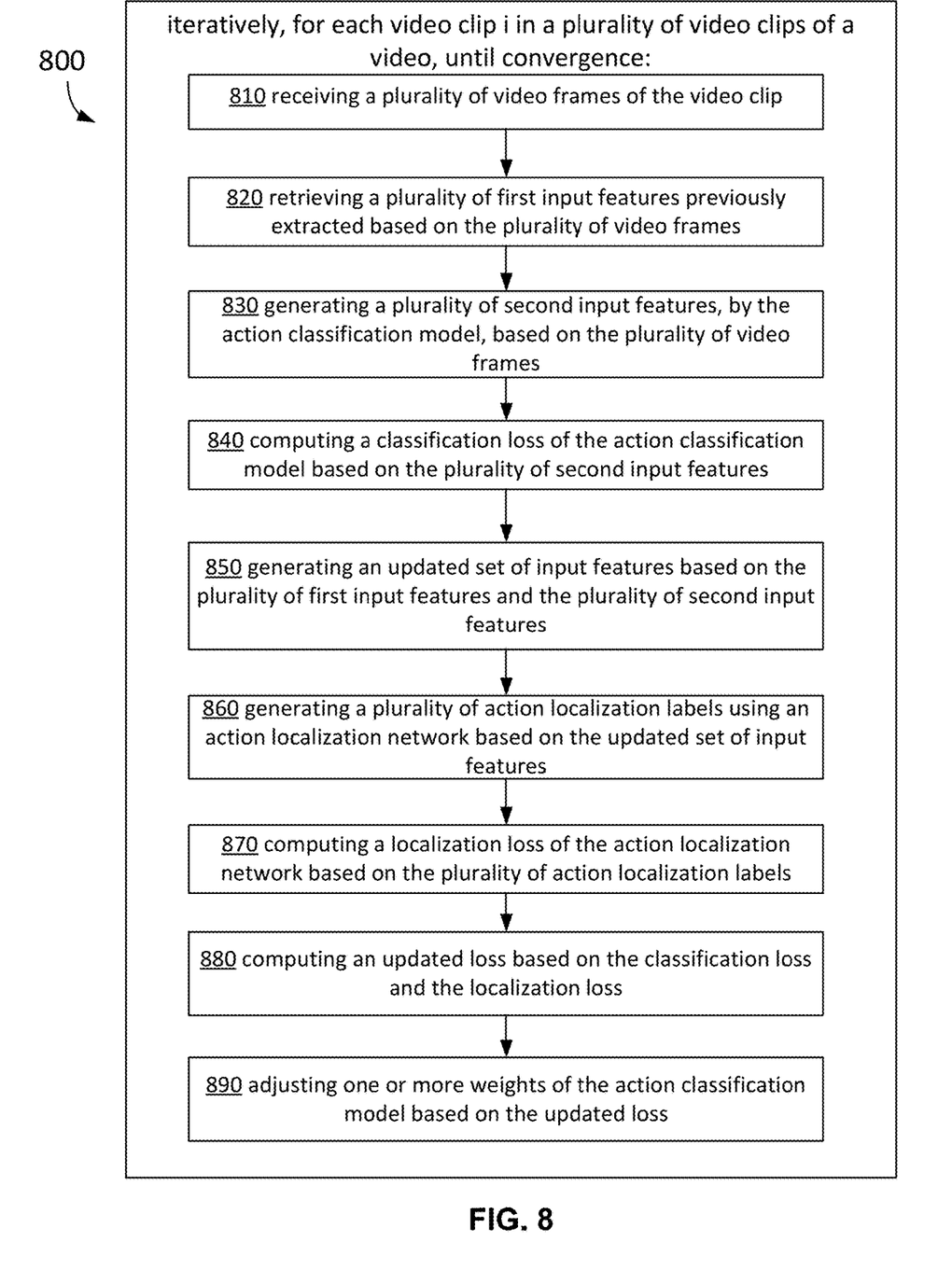
FIG. 8 illustrates an example process for training an action classification model, in accordance with an example embodiment.

FIG. 8 illustrates an example process 800 for training an action classification model, in accordance with an example embodiment. The process 800 may be implemented by a system 500 shown in FIG. 5, for example. The process 800 may include, iteratively, for each video clip i in a plurality of video clips of a video, until the action classification model has reached convergence, operations 810 to 890.

At operation 810, the system may receive a plurality of video frames 102 of the video clip i 103. Each video frames 102 may include RGB pixel values.

At operation 820, the system may retrieve a plurality of first input features $C_{i,old}$ previously extracted based on the plurality of video frames 102 of the video clip i 103. $C_{i,old}$ may be part of $C_V$, which are the input features previously extracted based on the entire video by an action classification model.

At operation 830, the action classification model in training may generate a plurality of second (or new) input features $C_{i,new}$, based on the plurality of video frames 102 of the video clip i 103.

At operation 840, the system may compute a classification loss $L_c$ of the action classification model based on the plurality of second input features $C_{i,new}$.

At operation 850, the system may generate an updated set of input features $C_i$ based on the plurality of first input features $C_{i,old}$ and the plurality of second input features $C_{i,new}$. For example, $C_i$ may be generated based on the equation:

$$C_i = \alpha * C_{i,new} + (1-\alpha) * C_{i,old}$$

where $C_i$ represents the updated set of input features, $C_{i,old}$ represents the plurality of first input features, $C_{i,new}$ represents the plurality of second input features, and α represents a parameter ∈ R.

In some embodiments, a is a value between 0.01 to 0.1.

At operation 860, the system may generate a plurality of action localization labels using an action localization network based on the updated set of input features $C_i$.

In some embodiments, generating the plurality of action localization labels using the action localization network based on the updated set of input features $C_i$ may include: retrieving a set of previously extracted input features $C_V$ of the video, $C_V$ including $C_{i,old}$; updating $C_V$ by replacing $C_{i,old}$ with $C_i$ to obtain updated input features $C_V'$ for the entire video; and computing the plurality of action localization labels using the action localization network based on the updated $C_V'$.

At operation 870, the system may compute a localization loss $L_l$ of the action localization network based on the plurality of action localization labels.

At operation 880, the system may compute an updated loss based on the classification loss $L_c$ of the action classification model and the localization loss $L_l$ of the action localization network. For example, the updated loss may be computed based on the equation:

$$L_T = \beta * L_c + (1+\beta) * L_l$$

where $L_T$ represents the updated loss, $L_c$ represents the classification loss of the action classification model, $L_l$ represents the localization loss of the action localization network, and β represents a parameter ∈R.

In some embodiments, β is a value between 0.1 to 0.9.

At operation 890, the system may adjusting one or more weights of the action classification model based on the updated loss $L_T$, which is propagated back to the action classification model in training.

As used here, a "model" can refer to a combination of a hardware processing circuit and machine-readable instructions (software and/or firmware) executable on the hardware processing circuit that is configured to apply a processing function to input data to generate a corresponding output. A "machine learning model" can refer to a model for which the processing function has been learned or trained using machine learning (ML) techniques. A "classifier", "classifier model" or "classification model" can refer to a model for which the processing function is configured to generate an output (e.g., a label) that classifies the input data.

Many different types and configurations of trained classification models can be incorporated into the action classification model in FIGS. 4 and 5, including models that are based on artificial neural network structures, including but not limited to models that are based on or more of Convolution Neural Network (CNN), Recurrent Neural Network (RNN), Long Short-Term Memory (LSTM) and/or transformer architectures. Other possible types of machine learning classification modules that can be incorporated into the action classification model include models that are based on decision tree algorithms, support vector machine algorithms, and logistic regression algorithms.

Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The invention claimed is:

1. A computer implemented method for processing a video, the method comprising:
   receiving a plurality of video frames of the video;
   generating a plurality of first input features based on the plurality of video frames;
   generating a plurality of second input features based on reversing a temporal order of the plurality of first input features;
   generating a first set of joint attention features based on the plurality of first input features;
   generating a second set of joint attention features based on the plurality of second input features; and
   concatenating the first set of joint attention features and the second set of joint attention features to generate a final set of joint attention features.

2. The method of claim 1, wherein generating the first set of joint attention features based on the plurality of first input features comprises:
   generating a set of attention weights based on the plurality of first input features;
   extracting a set of position-encoded input features based on the plurality of first input features; and
   computing the first set of joint attention features based on multiplying the set of attention weights by the set of position-encoded input features.

3. The method of claim 1, wherein generating the set of attention weights for the plurality of first input features comprises:
   adding a dimension to the plurality of first input features to generate a 2D feature map; and
   transforming the 2D feature map to generate the set of attention weights for the plurality of first input features.

4. The method of claim 3, further comprising:
processing the final set of joint attention features to generate:
one or more action localization labels of the video;
a corresponding start time for each of the one or more action localization labels of the video; and
a corresponding end time for each of the one or more action localization labels of the video.

5. The method of claim 4, wherein the one or more action localization labels of the video are generated by a Boundary Matching Network (BMN) or a Sub-Graph Temporal Action Detection (GTAD) based on the final set of joint attention features.

6. The method of claim 1, wherein the plurality of first input features are generated based on the plurality of video frames by an action classification model.

7. The method of claim 6, wherein the action classification model comprises Temporal Segment Networks (TSN) or a Temporal Shift Model (TSM).

8. A computer implemented method for training an action classification model, the method comprising, iteratively, for each video clip in a plurality of video clips of a video:
receiving a plurality of video frames of the video clip;
retrieving a plurality of first input features previously extracted based on the plurality of video frames;
generating a plurality of second input features, by the action classification model, based on the plurality of video frames;
computing a classification loss of the action classification model based on the plurality of second input features;
generating an updated set of input features based on the plurality of first input features and the plurality of second input features;
generating a plurality of action localization labels using an action localization network based on the updated set of input features;
computing a localization loss of the action localization network based on the plurality of action localization labels;
computing an updated loss based on the classification loss of the action classification model and the localization loss of the action localization network; and
adjusting one or more weights of the action classification model based on the updated loss.

9. The method of claim 8, wherein the updated set of input features is generated based on the equation:

$$C_i = \alpha * C_{i,new} + (1-\alpha) * C_{i,old}$$

wherein $C_i$ represents the updated set of input features, $C_{i,old}$ represents the plurality of first input features, $C_{i,new}$ represents the plurality of second input features, and $\alpha$ represents a parameter $\in R$.

10. The method of claim 9, wherein $\alpha$ has a value between 0.01 to 0.1.

11. The method of claim 9, wherein generating the plurality of action localization labels using the action localization network based on the updated set of input features comprises:
retrieving a set of previously extracted input features $C_V$ of the video, $C_V$ including $C_{i,old}$;
updating $C_V$ by replacing $C_{i,old}$ with $C_i$ to obtain updated $C_V'$; and
computing the plurality of action localization labels using the action localization network based on the updated $C_V'$.

12. The method of claim 8, wherein the updated loss is computed based on the equation:

$$L_T = \beta * L_c + (1-\beta) * L_l$$

wherein $L_T$ represents the updated loss, $L_c$ represents the classification loss of the action classification model, $L_l$ represents the localization loss of the action localization network, and $\beta$ represents a parameter $\in R$.

13. The method of claim 12, wherein $\beta$ has a value between 0.1 to 0.9.

14. The method of claim 8, wherein the action classification model comprises Temporal Segment Networks or a Temporal Shift Model.

15. The method of claim 8, wherein the action localization network comprises a BMN, a Gaussian Temporal Awareness Network or a GTAD.

16. A system for processing a video, the system comprising:
a processing unit; and
a memory coupled to the processing unit, the memory storing machine-executable instructions that, when executed by the processing unit, cause the system to:
receive a plurality of video frames of a video;
generate a plurality of first input features based on the plurality of video frames;
generate a plurality of second input features based on reversing a temporal order of the plurality of first input features;
generate a first set of joint attention features based on the plurality of first input features;
generate a second set of joint attention features based on the plurality of second input features; and
concatenate the first set of joint attention features and the second set of joint attention features to generate a final set of joint attention features.

17. The system of claim 16, wherein the machine-executable instructions, when executed by the processing unit, cause the system to generate the first set of joint attention features by:
generating a set of attention weights based on the plurality of first input features;
extracting a set of position-encoded input features based on the plurality of first input features; and
computing the first set of joint attention features based on multiplying the set of attention weights by the set of position-encoded input features.

18. The system of claim 16, wherein the machine-executable instructions, when executed by the processing unit, cause the system to generate the set of attention weights for the plurality of first input features by:
adding a dimension to the plurality of first input features to generate a 2D feature map; and
transforming the 2D feature map to generate the set of attention weights for the plurality of first input features.

19. The system of claim 18, wherein the machine-executable instructions, when executed by the processing unit, further cause the system to:
process the final set of joint attention features to generate:
one or more action localization labels of the video;
a corresponding start time for each of the one or more action localization labels of the video; and
a corresponding end time for each of the one or more action localization labels of the video.

20. The system of claim 16, wherein the plurality of first input features are generated based on the plurality of video frames by an action classification model.

* * * * *

UNITED STATES PATENT AND TRADEMARK OFFICE
CERTIFICATE OF CORRECTION

PATENT NO. : 11,902,548 B2
APPLICATION NO. : 17/203613
DATED : February 13, 2024
INVENTOR(S) : Deepak Sridhar et al.

It is certified that error appears in the above-identified patent and that said Letters Patent is hereby corrected as shown below:

In the Specification

Column 3, Line 28:
"represents the plurality of first input features, represents"
Should read:
-- represents the plurality of first input features, $C_{i,new}$ represents --

Signed and Sealed this
Seventh Day of May, 2024

Katherine Kelly Vidal
*Director of the United States Patent and Trademark Office*